US012608117B2

(12) United States Patent (10) Patent No.: US 12,608,117 B2
Sakaguchi (45) Date of Patent: Apr. 21, 2026

(54) IMAGE FORMING APPARATUS, NON-TRANSITORY COMPUTER READABLE MEDIUM, AND IMAGE FORMING METHOD FOR SWITCHING DISPLAYED ADDRESS BY HOVER OPERATION

(71) Applicant: FUJIFILM Business Innovation Corp., Tokyo (JP)

(72) Inventor: Katsutoshi Sakaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 418 days.

(21) Appl. No.: 17/958,448

(22) Filed: Oct. 3, 2022

(65) Prior Publication Data

US 2023/0289036 A1 Sep. 14, 2023

(30) Foreign Application Priority Data

Mar. 14, 2022 (JP) ................................. 2022-039489

(51) Int. Cl.
 *G06F 3/0482* (2013.01)
 *G06F 3/0485* (2022.01)
 *H04N 1/00* (2006.01)
(52) U.S. Cl.
 CPC .......... *G06F 3/0482* (2013.01); *G06F 3/0485* (2013.01); *H04N 1/00427* (2013.01)
(58) Field of Classification Search
 CPC .............................. G06F 3/0482; G06F 3/0485
 See application file for complete search history.

(56) References Cited

U.S. PATENT DOCUMENTS

| | | | | |
|---|---|---|---|---|
| 8,860,672 B2 * | 10/2014 | Ewing, Jr. | ............... | G06F 3/041 |
| | | | | 345/173 |
| 10,275,035 B2 | 4/2019 | Sugiura et al. | | |
| 2006/0095846 A1 * | 5/2006 | Nurmi | ..................... | G06F 3/016 |
| | | | | 715/810 |
| 2008/0055247 A1 * | 3/2008 | Boillot | .................... | G06F 3/038 |
| | | | | 345/158 |
| 2008/0059915 A1 * | 3/2008 | Boillot | .................. | G06F 3/0346 |
| | | | | 715/863 |
| 2008/0235621 A1 * | 9/2008 | Boillot | .................... | G06F 3/017 |
| | | | | 707/999.005 |

(Continued)

FOREIGN PATENT DOCUMENTS

| | | |
|---|---|---|
| JP | 2013175174 | 9/2013 |
| JP | 2014106616 | 6/2014 |

(Continued)

OTHER PUBLICATIONS

"Notice of Reasons for Refusal of Japan Counterpart Application, Application No. 2022-039489", issued on Nov. 4, 2025, with English translation thereof, p. 1-p. 6.

(Continued)

*Primary Examiner* — Asher D Kells
(74) *Attorney, Agent, or Firm* — JCIPRNET

(57) ABSTRACT

An image forming apparatus includes a processor configured to switch one or more addresses to be displayed on a screen displaying the one or more addresses among plural addresses used for a transmission function for transmitting information according to a change in coordinates of a moving object without touching the screen.

6 Claims, 10 Drawing Sheets

(56)                References Cited

U.S. PATENT DOCUMENTS

| | | | | |
|---|---|---|---|---|
| 2008/0284726 A1* | 11/2008 | Boillot | G06F 3/0383 | 345/156 |
| 2009/0135135 A1* | 5/2009 | Tsurumi | G06F 3/04845 | 345/156 |
| 2009/0237421 A1* | 9/2009 | Kim | G06F 3/0485 | 345/173 |
| 2010/0175027 A1* | 7/2010 | Young | G06F 3/0485 | 715/830 |
| 2012/0054670 A1* | 3/2012 | Rainisto | G06F 3/04883 | 345/173 |
| 2012/0127208 A1* | 5/2012 | Jo | G06F 3/0487 | 345/684 |
| 2013/0104074 A1* | 4/2013 | Takahashi | G06F 3/0488 | 715/784 |
| 2013/0212531 A1* | 8/2013 | Yoshida | G06F 3/0482 | 715/829 |
| 2013/0246973 A1* | 9/2013 | Tomiyasu | H04N 1/00482 | 715/830 |
| 2013/0286435 A1* | 10/2013 | Anezaki | H04N 1/00411 | 358/1.15 |
| 2014/0055395 A1* | 2/2014 | Kim | G06F 3/0485 | 345/173 |
| 2014/0068502 A1* | 3/2014 | Tomiyasu | G06F 3/0485 | 715/784 |
| 2014/0098402 A1* | 4/2014 | Komaba | G06F 3/04883 | 358/1.15 |
| 2014/0104648 A1* | 4/2014 | Shinosaki | H04N 1/00411 | 358/1.15 |
| 2014/0149923 A1 | 5/2014 | Horiike | | |
| 2014/0267142 A1* | 9/2014 | MacDougall et al. | G06F 3/044 | 345/174 |
| 2015/0309681 A1* | 10/2015 | Plagemann | G06F 3/0304 | 715/863 |
| 2015/0363040 A1* | 12/2015 | Nagata | G06F 3/0485 | 345/173 |
| 2016/0224235 A1* | 8/2016 | Forsström | G06F 3/04845 | |
| 2017/0344339 A1* | 11/2017 | Molesky | G06F 3/167 | |
| 2018/0246636 A1* | 8/2018 | Horiike | H04N 1/00461 | |
| 2022/0035500 A1* | 2/2022 | Sato | G06F 3/0482 | |
| 2024/0152256 A1* | 5/2024 | Dascola | G06F 3/0482 | |

FOREIGN PATENT DOCUMENTS

| | | | | |
|---|---|---|---|---|
| JP | 2014186401 | 10/2014 | | |
| JP | 2014186581 | 10/2014 | | |
| WO | WO-2016016902 A1 * | 2/2016 | | G06F 3/0485 |

OTHER PUBLICATIONS

"Decision of Refusal of Japan Counterpart Application", issued on Feb. 17, 2026, with English translation thereof, p. 1-p. 5.

* cited by examiner

LANGUAGE SETTING

DATE AND TIME SETTING

| 2021 | / | 1 | / | 1 |

AM
PM

| 11 | : | 22 |

IMAGE FORMING APPARATUS, NON-TRANSITORY COMPUTER READABLE MEDIUM, AND IMAGE FORMING METHOD FOR SWITCHING DISPLAYED ADDRESS BY HOVER OPERATION

CROSS-REFERENCE TO RELATED APPLICATIONS

This application is based on and claims priority under 35 USC 119 from Japanese Patent Application No. 2022-039489 filed Mar. 14, 2022.

BACKGROUND

(i) Technical Field

The present invention relates to an image forming apparatus, a non-transitory computer readable medium storing an image forming program, and an image forming method.

(ii) Related Art

JP2013-175174A describes an electronic device capable of performing various processes with high accuracy using a proximity touch panel.

SUMMARY

In recent years, image forming apparatuses that can be operated without touching a screen have begun to spread. Here, the image forming apparatus may have a transmission function such as scan transmission and fax transmission, and in this case, a plurality of addresses can be used as the address of the transmission function.

However, in the image forming apparatus, the size of the screen is limited, and due to restrictions on display, it may not be possible to display all of a plurality of addresses used for the transmission function on one screen. In this case, a user cannot check all the addresses used for the transmission function on the one screen.

Aspects of non-limiting embodiments of the present disclosure relate to an image forming apparatus, a non-transitory computer readable medium storing an image forming program, and an image forming method that enable a user to check a plurality of addresses used for the transmission function on one screen in an image forming apparatus that can be operated without touching a screen.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to switch one or more addresses to be displayed on a screen displaying the one or more addresses among a plurality of addresses used for a transmission function for transmitting information according to a change in coordinates of a moving object without touching the screen.

BRIEF DESCRIPTION OF THE DRAWINGS

Exemplary embodiment(s) of the present invention will be described in detail based on the following figures, wherein:

FIGS. 9A and 9B are first explanatory diagrams showing another switching example of display content of a display unit.

DETAILED DESCRIPTION

Hereinafter, an image forming apparatus 20 according to the present exemplary embodiment will be described.

First Exemplary Embodiment

First, the image forming apparatus 20 according to the present exemplary embodiment will be described.

Figure 1:
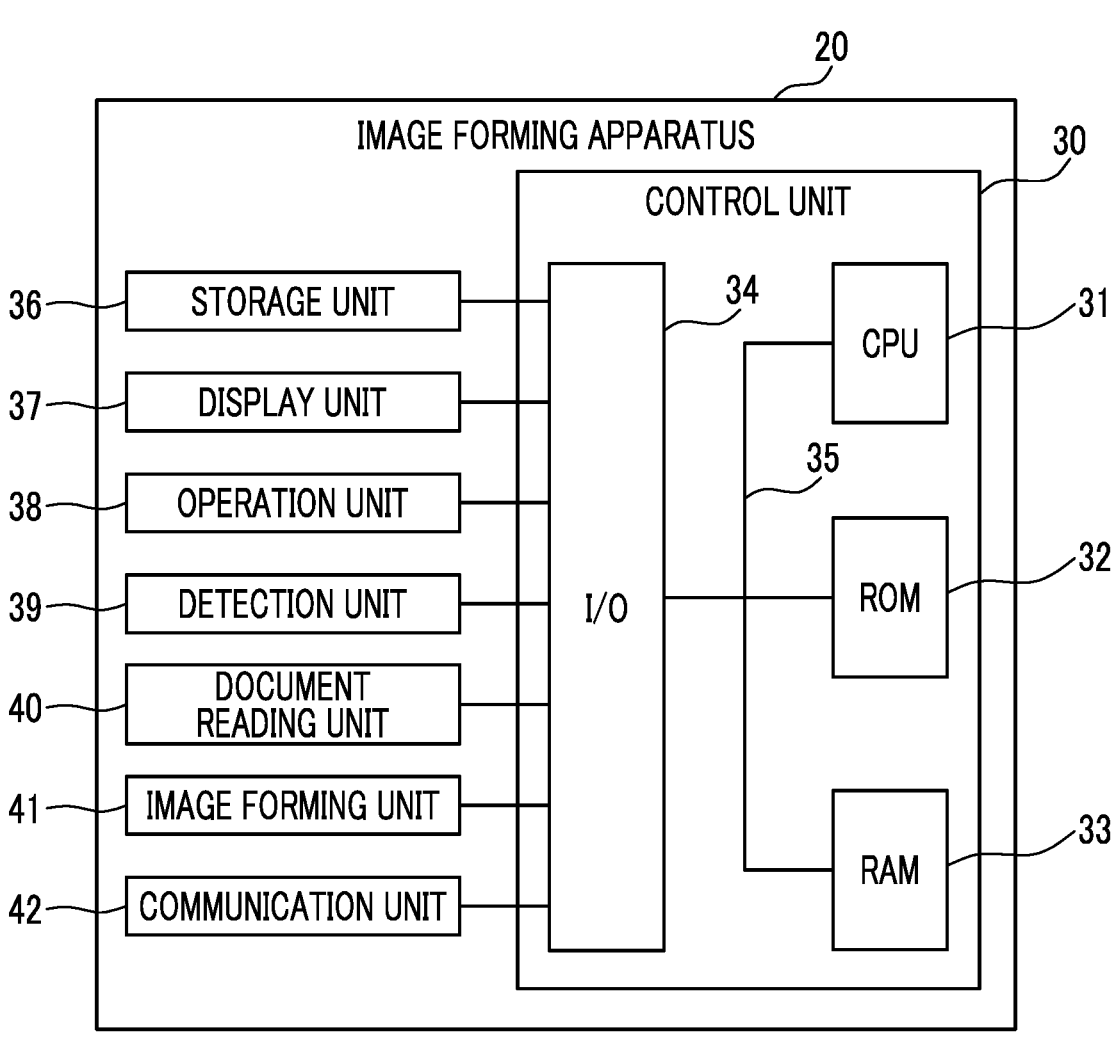
FIG. 1 is a block diagram showing a hardware configuration of an image forming apparatus.

FIG. 1 is a block diagram showing a hardware configuration of the image forming apparatus 20.

As shown in FIG. 1, the image forming apparatus 20 includes a control unit 30 that controls the operation of the image forming apparatus 20. In the control unit 30, a central processing unit (CPU) 31, a read only memory (ROM) 32, a random access memory (RAM) 33, and an input/output interface (I/O) 34 are connected to each other via a bus 35 so as to be communicable with each other.

The CPU 31 is a central arithmetic processing unit that executes various programs and controls each unit. That is, the CPU 31 reads the program from the ROM 32 or a storage unit 36 to be described later, and executes the program using the RAM 33 as a work area. The CPU 31 controls each of the above configurations and performs various arithmetic processes according to the program stored in the ROM 32 or the storage unit 36. The ROM 32 or the storage unit 36 stores at least an image forming program for executing a switching process to be described later. The image forming program may be pre-installed on the image forming apparatus 20, or may be appropriately installed on the image forming apparatus 20 by being stored in a non-volatile storage medium or being distributed via a network. Examples of the non-volatile storage medium include a CD-ROM, a magneto-optical disc, a hard disk drive (HDD), a DVD-ROM, a flash memory, a memory card, and the like. The CPU 31 is an example of a "processor".

The ROM 32 stores various programs and various data. The RAM 33 temporarily stores a program or data as a work area.

The storage unit 36, a display unit 37, an operation unit 38, a detection unit 39, a document reading unit 40, an image forming unit 41, and a communication unit 42 are connected to the I/O 34. Each of these units can communicate with the CPU 31 via the I/O 34.

The storage unit 36 is composed of a storage device such as an HDD, a solid state drive (SSD), or a flash memory, and stores various programs and various data.

For the display unit 37, for example, a liquid crystal display, an organic electroluminescence (EL) display, or the like is used. The display unit 37 integrally has a touch panel.

The operation unit 38 is provided with operation keys such as a home key and a power key.

The display unit 37 and the operation unit 38 receive various instructions from a user of the image forming apparatus 20. These various instructions include, for example, an instruction to start reading the document, an instruction to start copying the document, and the like. The display unit 37 displays various information such as a result of the process executed in response to the instruction received from the user and a notification for the process.

The detection unit 39 includes sensors such as an infrared sensor and an ultrasonic sensor, and detects the coordinates of the user's hand, which is a moving object, without touching the display unit 37. The coordinates include an X coordinate and a Y coordinate which are coordinates in a direction of an X axis and a Y axis parallel to the display unit 37, and a Z coordinate which is a coordinate in a direction of a Z axis orthogonal to the X axis and Y axis. As an example, the detection unit 39 detects the coordinates of each axis (X axis, Y axis, and Z axis) indicating the position of the user's hand at regular time intervals. In addition, the coordinate values of the coordinates detected by the detection unit 39 are stored in the storage unit 36 in association with the detected time.

Here, the image forming apparatus 20 can perform a so-called hover operation that can be operated without directly touching the display unit 37. In the hover operation, the operation corresponding to the change in the coordinates of the user's hand detected by the detection unit 39 is executed. Specific examples of the hover operation will be described later.

The document reading unit 40 captures documents placed on a paper feed tray of an automatic document feeder (not shown) provided in the upper part of the image forming apparatus 20 one by one, and optically reads the captured documents to obtain image information. Alternatively, the document reading unit 40 optically reads the document placed on a document stand such as platen glass to obtain image information.

The image forming unit 41 forms an image based on the image information obtained by reading by the document reading unit 40 or image information obtained from an external personal computer (PC) or the like connected via the network on a recording medium such as paper.

The communication unit 42 is an interface for communicating with other devices. For the communication, for example, a wired communication standard such as Ethernet (registered trademark) or FDDI, or a wireless communication standard such as 4G, 5G, or Wi-Fi (registered trademark) is used.

In the case of executing the above image forming program, the image forming apparatus 20 uses the above hardware resources to execute processing based on the image forming program.

Here, the image forming apparatus 20 can execute a transmission function for transmitting information. The transmission function includes, for example, a fax transmission function, a scan transmission function, and the like. In addition, in the image forming apparatus 20, a plurality of addresses can be used as the address of the transmission function. Also, in the image forming apparatus 20, in a case where a plurality of addresses are set as the addresses of the transmission function, the addresses to be displayed on the display unit 37 can be switched by the hover operation.

Figure 2:
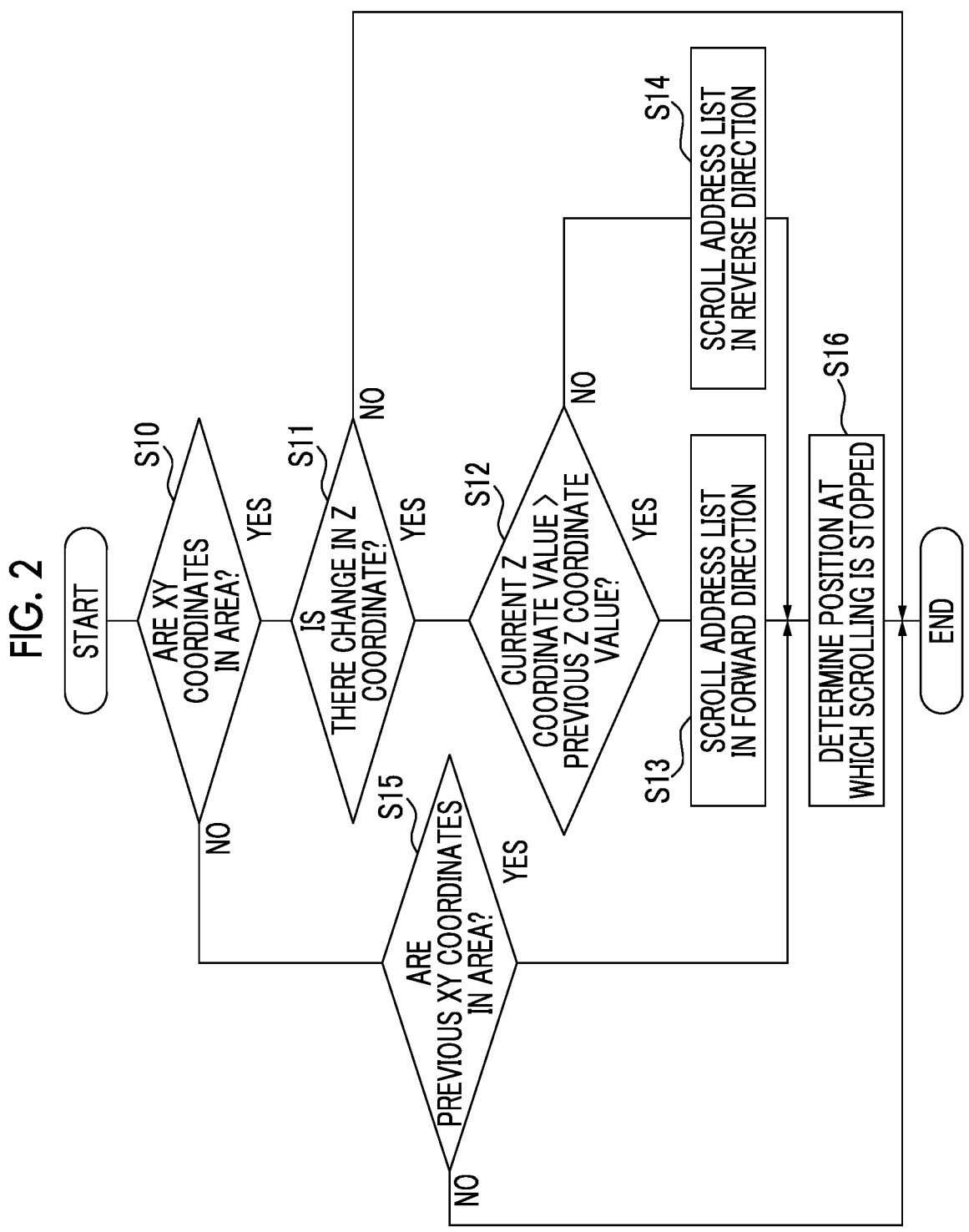
FIG. 2 is a first flowchart showing a flow of a switching process by the image forming apparatus.

FIG. 2 is a first flowchart showing a flow of a switching process performed by the image forming apparatus 20 for switching addresses to be displayed on the display unit 37 by scrolling a address list indicating a plurality of addresses used for the transmission function. The switching process is performed by the CPU 31 reading an image forming program from the ROM 32 or the storage unit 36, loading the image forming program into the RAM 33, and executing the image forming program.

In step S10 shown in FIG. 2, the CPU 31 determines whether or not the X coordinate and the Y coordinate (hereinafter referred to as "XY coordinates") of the user's hand are in an area 55, which will be described later, of the display unit 37, and in a case where the CPU 31 determines that the XY coordinates are in the area 55 (step S10: YES), the process proceeds to step S11. On the other hand, in a case where the CPU 31 determines that the XY coordinates of the user' hand are not in the area 55 (step S10: NO), the process proceeds to step S15.

In step S11, the CPU 31 determines whether or not there is a change in the Z coordinate of the user's hand, and the CPU 31 determines that there is a change (step S11: YES), the process proceeds to step S12. On the other hand, in a case where the CPU 31 determines that there is no change in the Z coordinate of the user's hand (step S11: NO), the switching process ends. As an example, the CPU 31 determines in step S11 whether or not there is a change between the Z coordinate at time t1 and the Z coordinate at time t2.

In step S12, the CPU 31 determines whether or not the current Z coordinate value of the user's hand, for example, the Z coordinate value at time t2 is larger than the previous Z coordinate value of the user's hand, for example, the Z coordinate value at time t1, and in a case where the CPU 31 determines that the Z coordinate value at time t2 is larger than the Z coordinate value at time t1 (step S12: YES), the process proceeds to step S13. On the other hand, in a case where the CPU 31 determines that the Z coordinate value at time t2 is smaller than the Z coordinate value at time t1 (step S12: NO), the process proceeds to step S14.

In step S13, the CPU 31 scrolls the address list in a forward direction. Then, the process proceeds to step S16.

In step S14, the CPU 31 scrolls the address list in a reverse direction. Then, the process proceeds to step S16.

In step S15, the CPU 31 determines whether or not the previous XY coordinates of the user's hand, for example, the XY coordinates at time t1 are in the area 55, and in a case where the CPU 31 determines that the previous XY coordinates of the user's hand are in the area 55 (step S15: YES), the process proceeds to step S16. On the other hand, in a case where the CPU 31 determines that the previous XY coordinates of the user's hand are not in the area 55 (step S15: NO), the switching process ends.

In step S16, the CPU 31 decides a position at which scrolling of the address list is stopped. As an example, the CPU 31 decides a scroll amount according to a difference between the current Z coordinate value and the previous Z coordinate value of the user's hand. In addition, in step S16, the CPU 31 initializes the previous Z coordinate value used for the comparison target in step S12. Then, the switching process ends.

Next, a specific example of the switching process shown in FIG. 2 will be described with reference to FIGS. 3A, 3B, 4A, 4B, and 5.

Figure 3A:
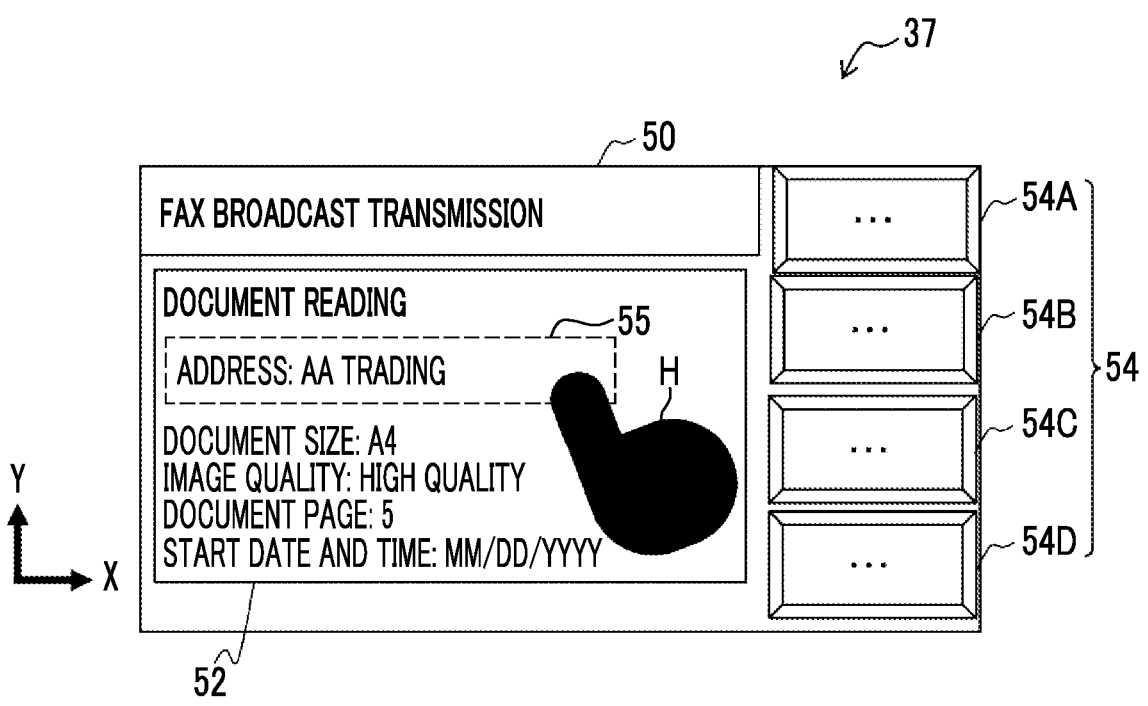
FIGS. 3A and 3B are first explanatory diagrams illustrating a specific example of the switching process.
Figure 3B:
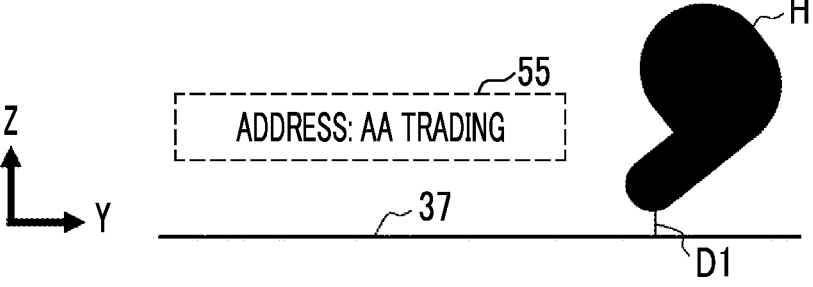

FIGS. 3A and 3B are first explanatory diagrams illustrating a specific example of the switching process.

First, FIG. 3A is a first display example displayed on the display unit 37 of the image forming apparatus 20.

In the display example shown in FIG. 3A, a function display unit 50, a message display unit 52, and a button display unit 54 are displayed.

The function display unit 50 is a portion showing a transmission function of the image forming apparatus 20. As an example, in FIG. 3A, "fax broadcast transmission" is displayed on the function display unit 50, indicating that the current transmission function is fax broadcast transmission.

The message display unit 52 is a portion showing various messages to the user. The message display unit 52 is provided with an area 55 for displaying one of a plurality of addresses set as the address of the transmission function. The area 55 is surrounded by a broken line in the display unit 37. As an example, in FIG. 3A, "Address: AA Trading" is displayed in the area 55, indicating that AA Trading is included in the address of the fax broadcast transmission.

The button display unit 54 is a portion showing buttons that can be used in the transmission function of the image forming apparatus 20. As an example, in FIG. 3A, four buttons, a button 54A, a button 54B, a button 54C, and a button 54D, are displayed on the button display unit 54. The processing content executed by operating each button is not particularly limited, and for example, by operating each button, the transmission function that is being executed can be stopped or the list of other addresses that have been set can be checked.

Further, in the display example shown in FIG. 3A, a hand H of a user is displayed in addition to each of the above display units. FIG. 3A shows a state in which a part of the hand H is displayed at a position overlapping the area 55, and the XY coordinates of the hand H are in the area 55. The hand H is an example of an "object".

Here, FIG. 3B is an explanatory diagram in the case where the display example shown in FIG. 3A is viewed from the side.

In FIG. 3B, as an example, the distance of the hand H from the display unit 37 in a Z direction is at the position of D1. In this case, "Address: AA Trading" is displayed in the area 55.

Figure 4A:
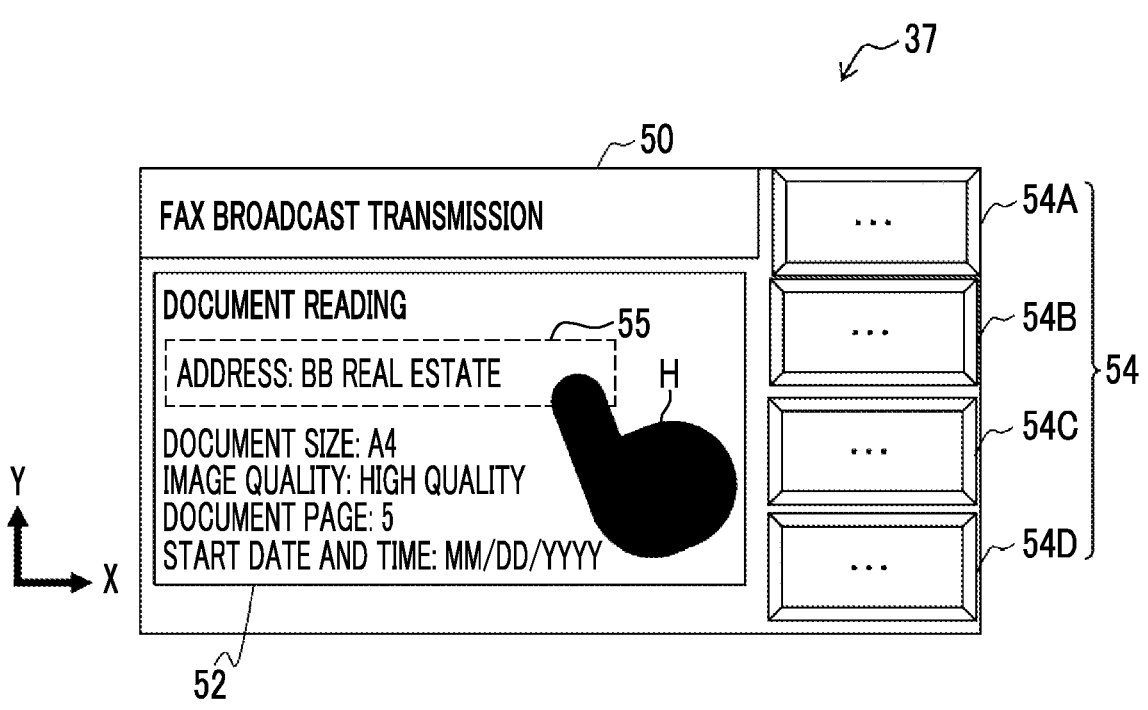
FIGS. 4A and 4B are second explanatory diagrams illustrating a specific example of the switching process.
Figure 4B:
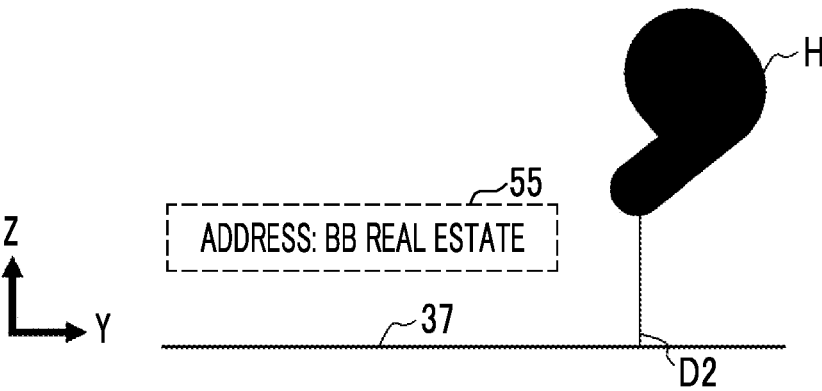

FIGS. 4A and 4B are second explanatory diagrams illustrating a specific example of the switching process.

First, FIG. 4A is a second display example displayed on the display unit 37 of the image forming apparatus 20, and shows a state after the hover operation is performed on the display example shown in FIG. 3A.

Each display unit displayed in FIG. 4A is the same as that in FIG. 3A, but the display content of the message display unit 52 is partially different. Specifically, FIG. 4A differs from FIG. 3A in that "Address: BB Real Estate" is displayed in the area 55 of the message display unit 52.

Next, FIG. 4B is an explanatory diagram in the case where the display example shown in FIG. 4A is viewed from the side.

In FIG. 4B, as an example, the distance of the hand H from the display unit 37 in the Z direction is at the position of D2, and the distance from the display unit 37 in the Z direction is farther than the state shown in FIG. 3B. In the first exemplary embodiment, as an example, the Z coordinate value of the hand H becomes larger as the distance between the hand H and the display unit 37 in the Z direction increases. Therefore, in the state shown in FIG. 4B, the Z coordinate value of the hand H is larger than the Z coordinate value of the hand H in the state shown in FIG. 3B.

Accordingly, the address list is scrolled in the forward direction from the state shown in FIG. 3B, and as a result, "Address: BB Real Estate" is displayed in the area 55 shown in FIG. 4B.

Figure 5:
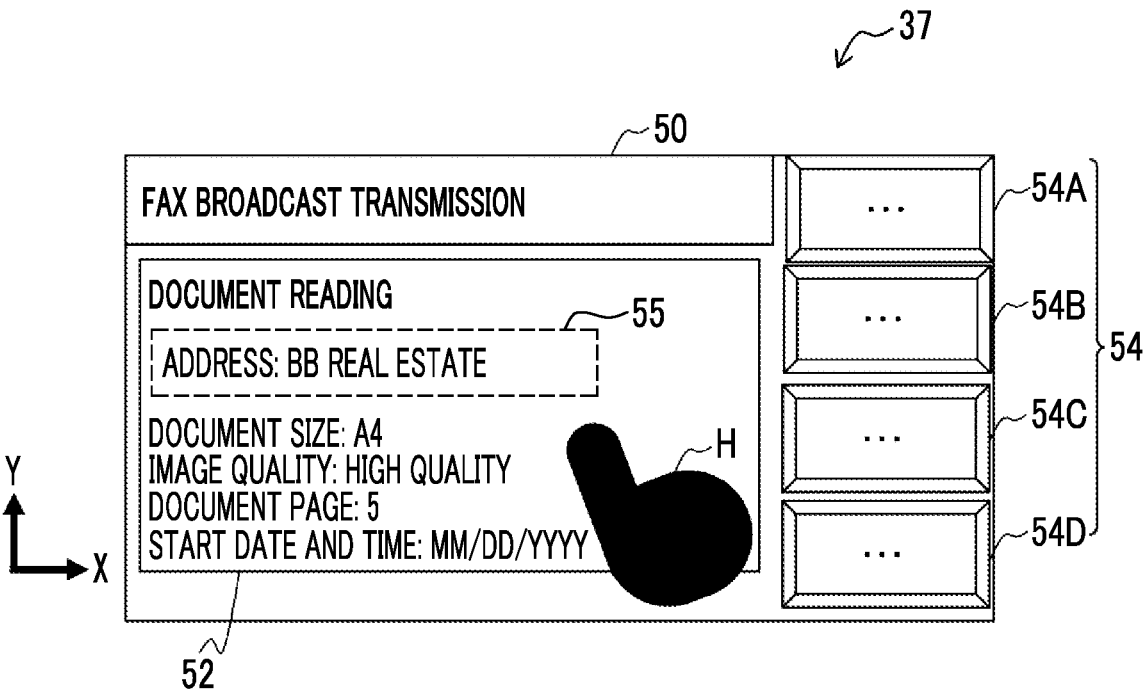
FIG. 5 is a third explanatory diagram illustrating a specific example of the switching process.

FIG. 5 is a third explanatory diagram illustrating a specific example of the switching process. Specifically, FIG. 5 shows a state in which the hand H has moved out of the area 55 from the state shown in FIG. 4A. The CPU 31 stops scrolling of the address list based on the fact that the hand H has moved out of the area 55.

Here, in the image forming apparatus, the size of the screen is limited, and due to restrictions on display that information other than the address need to be displayed on the screen, it may not be possible to display all of a plurality of addresses used for the transmission function on one screen. In this case, the user cannot check all the addresses used for the transmission function on the one screen. In this case, it is assumed that a separate screen will be displayed so that a plurality of addresses can be checked, but it is not advisable from the viewpoint of suppressing erroneous transmission, such as not being able to stop the transmission function that is being executed when the error of the address is ascertained on the separate screen.

Therefore, in the first exemplary embodiment, the CPU 31 switches one address to be displayed in the area 55 according to a change in the Z coordinate of the moving hand of the user without touching the area 55 of the display unit 37 in which one of the plurality of addresses used for the transmission function is displayed. Thereby, according to the first exemplary embodiment, it is possible for the user to check a plurality of addresses used for the transmission function on one screen. Further, according to the first exemplary embodiment, since it is not necessary to display the switching button for switching one address to be displayed in the area 55 on the display unit 37, it is possible to increase the degree of freedom in the screen layout of the display unit 37, such as arranging other buttons, as compared with the case of displaying the switching button.

Further, in the first exemplary embodiment, in a case where the user's hand moves in an upward direction, the CPU 31 scrolls the address list in the forward direction and switches one address to be displayed in the area 55 of the display unit 37. Also, in a case where the user's hand moves in a downward direction opposite to the upward direction, the CPU 31 scrolls the address list in the reverse direction opposite to the forward direction and switches one address to be displayed in the area 55. Thereby, according to the first exemplary embodiment, it is possible to associate the direction in which the user's hand moves with the direction in which the address list is scrolled. The upward direction is an example of a "first direction", the forward direction is an example of "one direction", the downward direction is an example of a "second direction", and the reverse direction is an example of the "other direction".

Second Exemplary Embodiment

Next, a second exemplary embodiment of the image forming apparatus 20 according to the present exemplary embodiment will be described while omitting or simplifying the overlapping portion with the other exemplary embodiments.

The image forming apparatus 20 according to the second exemplary embodiment sets an inertial state in which the address list is inertially scrolled and one address to be displayed in the area 55 of the display unit 37 is switched or a normal state in which the address list is normally scrolled instead of inertial scrolling and one address to be displayed in the area 55 is switched according to a moving speed at which the user's hand moves the Z coordinate. The normal scrolling is scrolling that follows a change in the Z coordinate of the user's hand as described in the first exemplary embodiment.

Further, the CPU 31 of the second exemplary embodiment calculates the moving speed of the Z coordinate using the Z coordinate value of the time before and after the detection by the detection unit 39 and the time before and after the detection. Specifically, the CPU 31 calculates the moving speed of the Z coordinate from the calculation formula (current Z coordinate value-previous Z coordinate value)/ (time of the current Z coordinate value-time of the previous Z coordinate value). The moving speed of the Z coordinate calculated by the CPU 31 is stored in the storage unit 36 in association with the coordinate value of each coordinate detected by the detection unit 39 and the time at which each coordinate value is detected. Hereinafter, the coordinate value of each coordinate, the time at which each coordinate value is detected, and the moving speed of the Z coordinate stored in the storage unit 36 are collectively referred to as "detection information".

Figure 6:
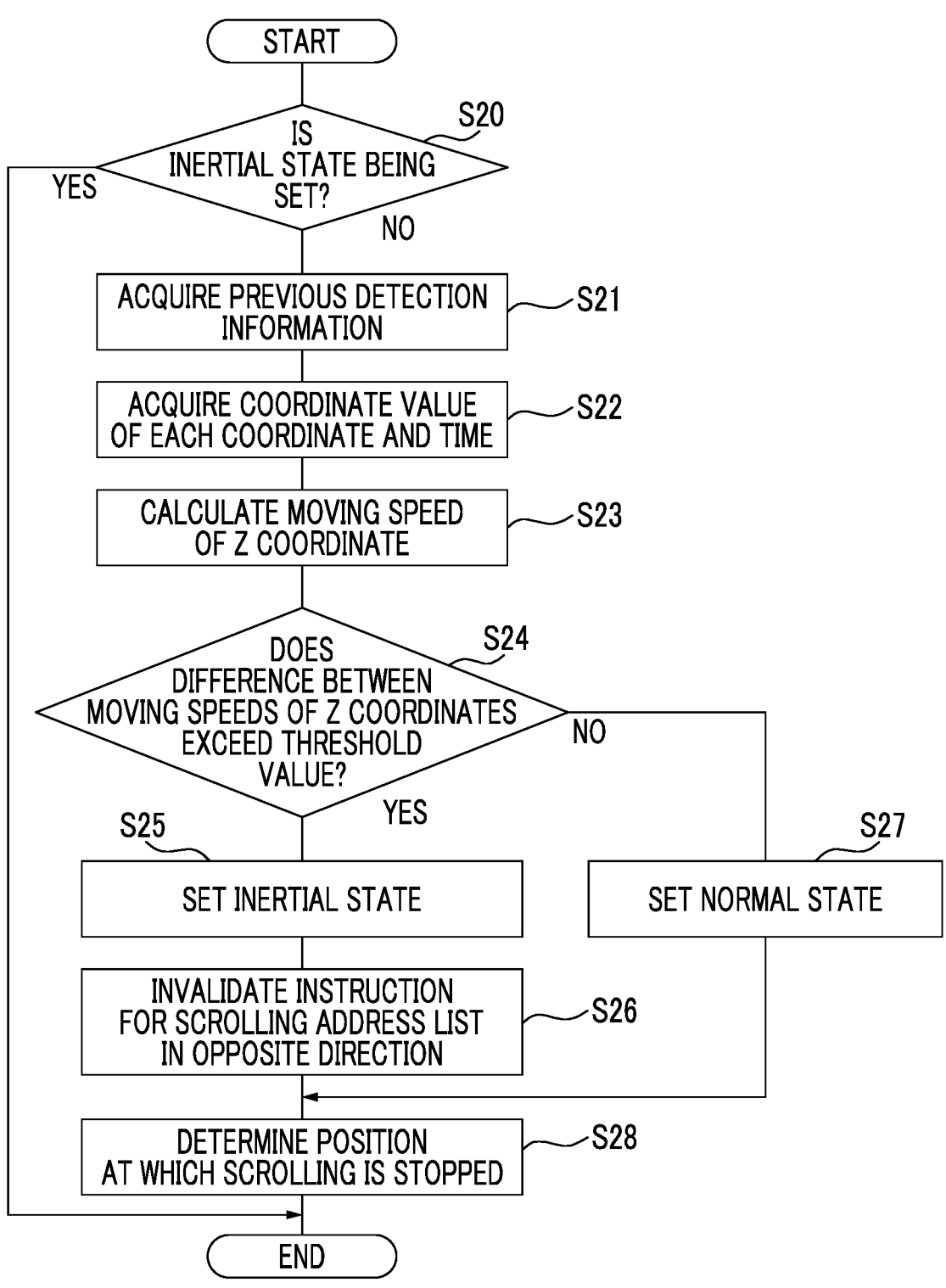
FIG. 6 is a second flowchart showing a flow of the switching process by the image forming apparatus.

Hereinafter, a flow in which any of the above states is set will be described using the flowchart shown in FIG. 6. FIG. 6 is a second flowchart showing a flow of the switching process by the image forming apparatus 20.

In step S20 shown in FIG. 6, the CPU 31 determines whether or not the inertial state is being set, and in a case where the CPU 31 determines that the inertial state is not being set (step S20: NO), the process proceeds to step S21. On the other hand, in a case where the CPU 31 determines that the inertial state is being set (step S20: YES), the switching process ends.

In step S21, the CPU 31 acquires detection information of the previous time (hereinafter referred to as "previous detection information") from the storage unit 36. The Z coordinate value acquired in step S21 is the "previous Z coordinate value" of the above calculation formula, and the time at which the Z coordinate value is detected is the "time of the previous Z coordinate value" of the above calculation formula. As an example, the CPU 31 acquires the previous detection information at time t1 in step S21. Then, the process proceeds to step S22.

In step S22, the CPU 31 acquires the coordinate value of each coordinate associated with the time next to the time indicated by the previous detection information acquired in step S21 from the storage unit 36. The Z coordinate value acquired in step S22 is the "current Z coordinate value" of the above calculation formula, and the time at which the Z coordinate value is detected is the "time of the current Z coordinate value" of the above calculation formula. As an example, in step S22, the CPU 31 acquires the coordinate value of each coordinate associated with time t2. Then, the process proceeds to step S23. As a premise of step S22, it is assumed that the XY coordinates of the user's hand are in the area 55 of the display unit 37.

In step S23, the CPU 31 calculates the moving speed of the Z coordinate corresponding to the time associated with the coordinate value of each coordinate acquired in step S22. Then, the process proceeds to step S24.

In step S24, the CPU 31 determines whether or not a difference obtained by subtracting a moving speed of the previous Z coordinate (hereinafter referred to as a "previous moving speed") indicated by the previous detection information acquired in step S21 from a moving speed of a current Z coordinate (hereinafter referred to as a "current moving speed") calculated in step S23 exceeds a threshold value, and in a case where the CPU 31 determines that the difference obtained by subtracting the previous moving speed from the current moving speed exceeds the threshold value (step S24: YES), the process proceeds to step S25. On the other hand, in a case where the CPU 31 determines that the difference obtained by subtracting the previous moving speed from the current moving speed does not exceed the threshold value (step S24: NO), the process proceeds to step S27.

In step S25, the CPU 31 sets a inertial state until a predetermined time elapses. In addition, in step S25, the CPU 31 initializes the previous detection information used for the comparison target in step S24. Then, the process proceeds to step S26.

In step S26, the CPU 31 invalidates the instruction for scrolling the address list in the direction opposite to the inertial scrolling direction until the inertial state ends. Then, the process proceeds to step S28.

In step S27, the CPU 31 sets a normal state. Then, the process proceeds to step S28.

In step S28, the CPU 31 decides a position at which scrolling of the address list is stopped. As an example, the CPU 31 decides the scroll amount according to whether the inertial state is being set or the normal state is being set. Then, the switching process ends. Note that the CPU 31 stops scrolling of the address list based on the fact that the XY coordinates of the user's hand are lost in the area 55 of the display unit 37 regardless of whether the inertial state is being set or the normal state is being set.

Next, a specific example of the switching process shown in FIG. 6 will be described with reference to FIGS. 7A, 7B, and 8A to 8C.

Figure 7A:
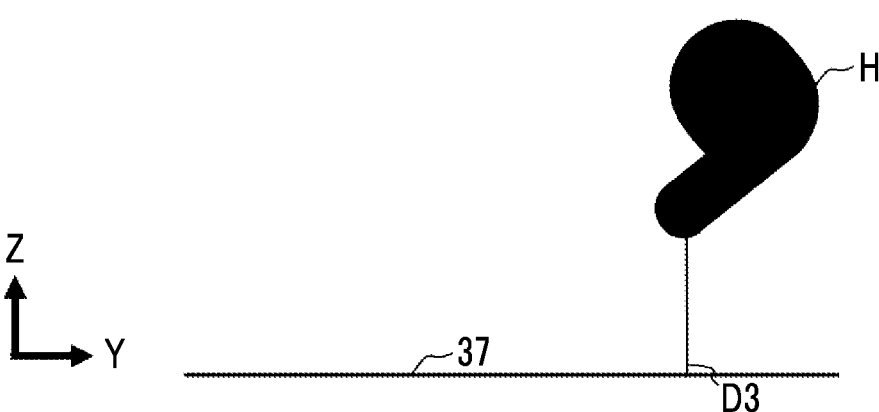
FIGS. 7A and 7B are fourth explanatory diagrams illustrating a specific example of the switching process.
Figure 7B:
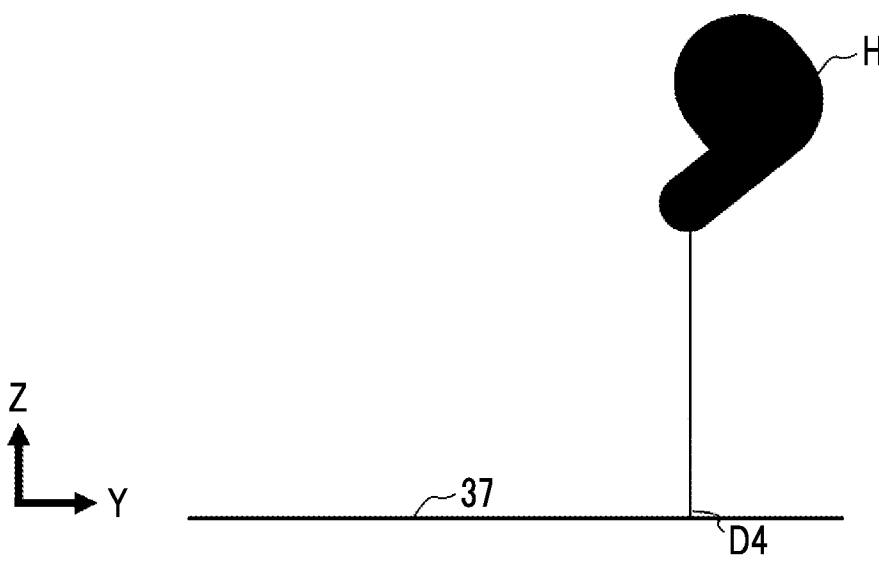

FIGS. 7A and 7B are fourth explanatory diagrams illustrating a specific example of the switching process. Specifically, FIG. 7A is an explanatory diagram showing the position of the hand H of the user at time t1, and FIG. 7B is an explanatory diagram showing the position of the hand H of the user at time t2.

In FIG. 7A, as an example, the distance of the hand H from the display unit 37 in the Z direction is at the position of D3, and in FIG. 7B, as an example, the distance of the hand H from the display unit 37 in the Z direction is at the position of D4. At this time, in FIG. 7B, as a result of hover operation, the distance from the display unit 37 in the Z direction is farther than the state shown in FIG. 7A.

Figure 8A:
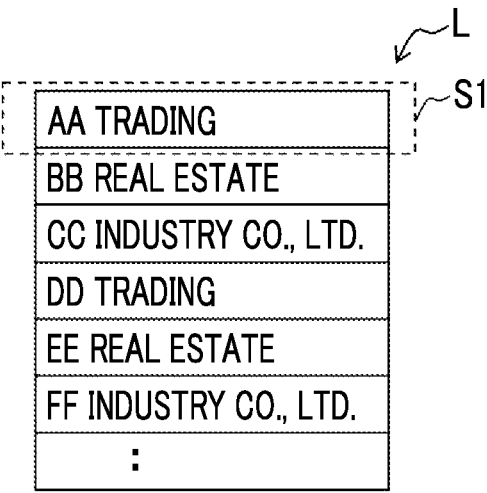
FIGS. 8A to 8C are fifth explanatory diagrams illustrating a specific example of the switching process.
Figure 8B:
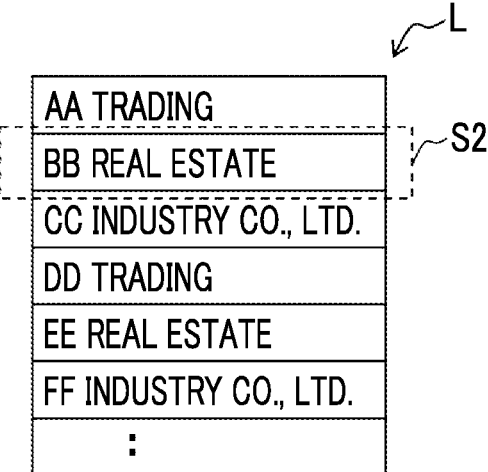
Figure 8C:
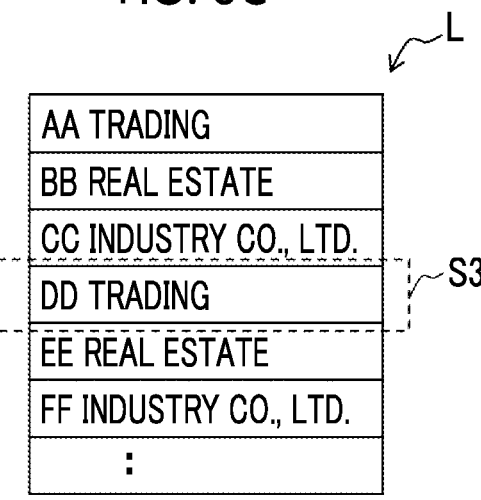

FIGS. 8A to 8C are fifth explanatory diagrams illustrating a specific example of the switching process. Specifically, FIG. 8A is a first explanatory diagram showing the display contents of a address list L and the area 55, FIG. 8B is a second explanatory diagram showing the display contents of the address list L and the area 55, and FIG. 8C is a third explanatory diagram showing the display contents of the address list L and the area 55.

As shown in FIGS. 8A, 8B, and 8C, the address list L shows, in order from the top, a plurality of addresses set as addresses for transmission functions such as XX Trading, BB Real Estate, and CC Industry Co., Ltd. Further, in FIGS. 8A, 8B, and 8C, one address shown in the address list L is surrounded by a broken line, and the one address surrounded by the broken line is displayed in the area 55 of the display unit 37.

Here, as an example, one address surrounded by a broken line S1 shown in FIG. 8A shows the display content in the area 55 in the state where the hand H of the user is at the position shown in FIG. 7A. In this case, "Address: AA Trading" is displayed in the area 55.

Next, as an example, one address surrounded by a broken line S2 shown in FIG. 8B shows the display content in the area 55 in the state where the address list L is normally scrolled in a case where the hand H of the user is hovered from the position shown in FIG. 7A to the position shown in FIG. 7B. In this case, "Address: BB Real Estate" is displayed in the area 55.

Next, as an example, one address surrounded by a broken line S3 shown in FIG. 8C shows the display content in the area 55 in the state where the address list L is inertially scrolled in a case where the hand H of the user is hovered from the position shown in FIG. 7A to the position shown in FIG. 7B. In this case, "Address: DD Trading" is displayed in the area 55.

In this way, in the second exemplary embodiment, even though the movement amount of the hand H of the user in the hover operation is the same, in a case where the moving speed at which the hand H of the user moves in the Z coordinate is different, the scroll amount of the address list L is different. Specifically, in the case where the inertial scroll is performed during setting of the inertial state, the scroll amount of the address list L is larger than that in the case where the normal scroll is performed during setting of the normal state.

As described above, in the second exemplary embodiment, the CPU 31 sets the inertial state according to the moving speed at which the user's hand moves the Z coordinate. Thereby, according to the second exemplary embodiment, the scroll amount of the address list with respect to the movement amount of the user's hand may be increased as compared with the case where a state other than the inertial state, for example, a normal state is set.

Further, in the second exemplary embodiment, the CPU 31 invalidates the instruction for scrolling the address list in the direction opposite to the direction in which the address list is scrolled during setting of the inertial state. Thereby, according to the second exemplary embodiment, it is possible to prevent the address list from being scrolled in a direction not intended by the user during setting of the inertial state.

Further, in the second exemplary embodiment, in a case where the user's hand moves in the upward direction while an end address at an end of the address list is displayed in the area 55 of the display unit 37 as one address, the CPU 31 switches the one address to be displayed in the area 55 to a head address at a head of the address list. Further, in a case where the user's hand moves in the downward direction while the head address is displayed in the area 55 as one address, the CPU 31 switches the one address to be displayed in the area 55 to the end address. As an example, in the address list L shown in FIGS. 8A to 8C, the end address is not shown, but in a case where the user's hand moves in the upward direction while the end address is displayed in the area 55, one address to be displayed in the area 55 is switched to the head address "AA Trading". Further, in the address list L shown in FIGS. 8A to 8C, in a case where the user's hand moves in the downward direction while the head address "AA Trading" is displayed in the area 55, the one address to be displayed in the area 55 is switched to the end address. Thereby, according to the second exemplary embodiment, one address displayed in the area 55 may be circulated by moving the user's hand in one direction.

Further, in the second exemplary embodiment, in a case where the one address displayed in the area 55 of the display unit 37 is switched from the end address to the head address, or in a case where the one address displayed in the area 55 of the display unit 37 is switched from the head address to the end address, the CPU 31 gives a notification of information indicating that the one addresses has been switched. As an example, the CPU 31 outputs a predetermined sound from a speaker (not shown). Thereby, according to the second exemplary embodiment, it is possible to make the user aware that the one addresses has been switched from the end address to the head address or the one addresses has been switched from the head address to the end address.

Others

In the above exemplary embodiments, one address is displayed in the area 55 of the display unit 37, but the present disclosure is not limited thereto, and one or more addresses may be displayed.

In the above exemplary embodiments, one address to be displayed in the area 55 of the display unit 37 is switched according to the change in the Z coordinate of the user's hand, but the present disclosure is not limited thereto, and one address to be displayed in the area 55 may be switched according to the change in the X coordinate or the Y coordinate of the user's hand.

In the above exemplary embodiments, the upward direction is an example of the "first direction", but the present disclosure is not limited thereto, and other directions such as the left direction, the right direction, or the downward direction may be an example of the "first direction".

In the above exemplary embodiments, the downward direction is an example of the "second direction", but the present disclosure is not limited thereto, and other directions such as the left direction, the right direction, or the upward direction may be an example of the "second direction".

In the above exemplary embodiments, the forward direction is an example of "one direction" and the reverse direction is an example of the "other direction", but the present disclosure is not limited thereto, and the forward direction may be an example of the "other direction" and the reverse direction may be an example of "one direction".

In the above exemplary embodiments, by outputting a predetermined sound from a speaker (not shown), the user is made aware that one addresses has been switched from the end address to the head address or one addresses has been switched from the head address to the end address. However, the present disclosure is not limited thereto, and the user may be made aware that the one addresses has been switched from the end address to the head address or the one addresses has been switched from the head address to the end address by another method such as displaying a predetermined display content on the display unit 37.

Figure 10A:
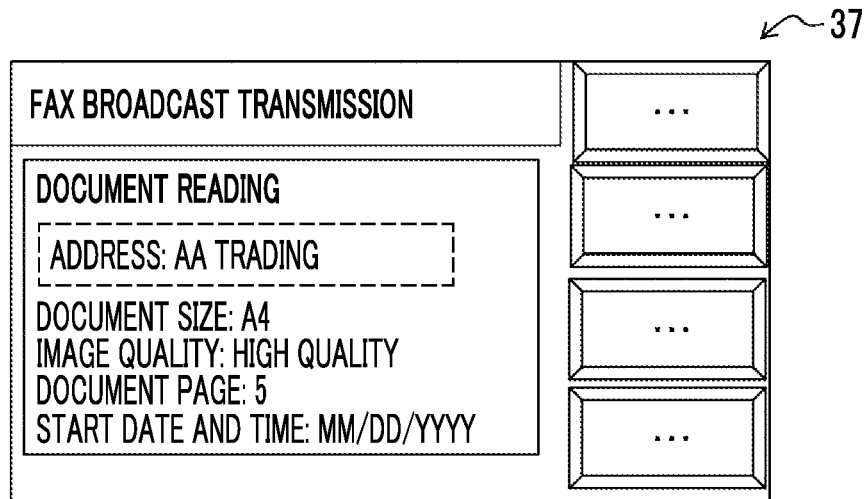
FIGS. 10A to 10C are second explanatory diagrams showing another switching example of display content of the display unit.
Figure 10B:
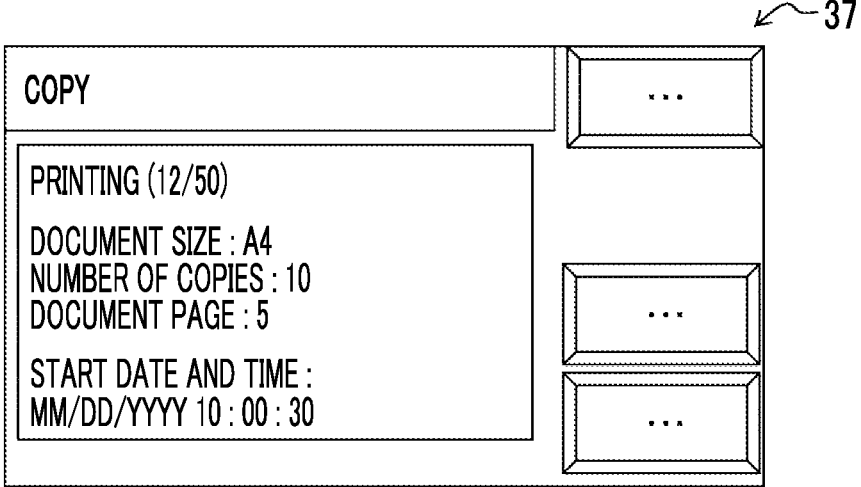
Figure 10C:
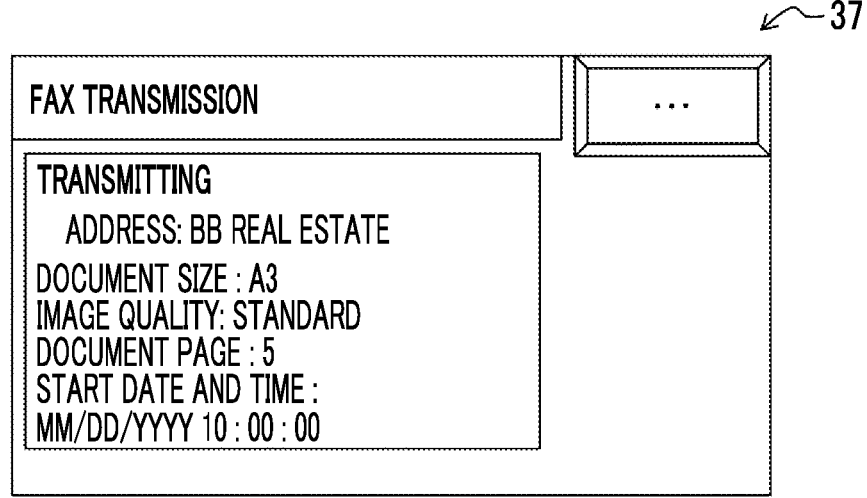

In the above exemplary embodiments, the address to be displayed on the display unit 37 is switched by the hover operation, but the display content of the display unit 37 that is switched by the hover operation is not limited. Here, FIGS. 9A and 9B are first explanatory diagrams showing another switching example of the display content of the display unit 37, and FIGS. 10A to 10C are second explanatory diagrams showing another switching example of the display content of the display unit 37.

Figures 9A, 9B:
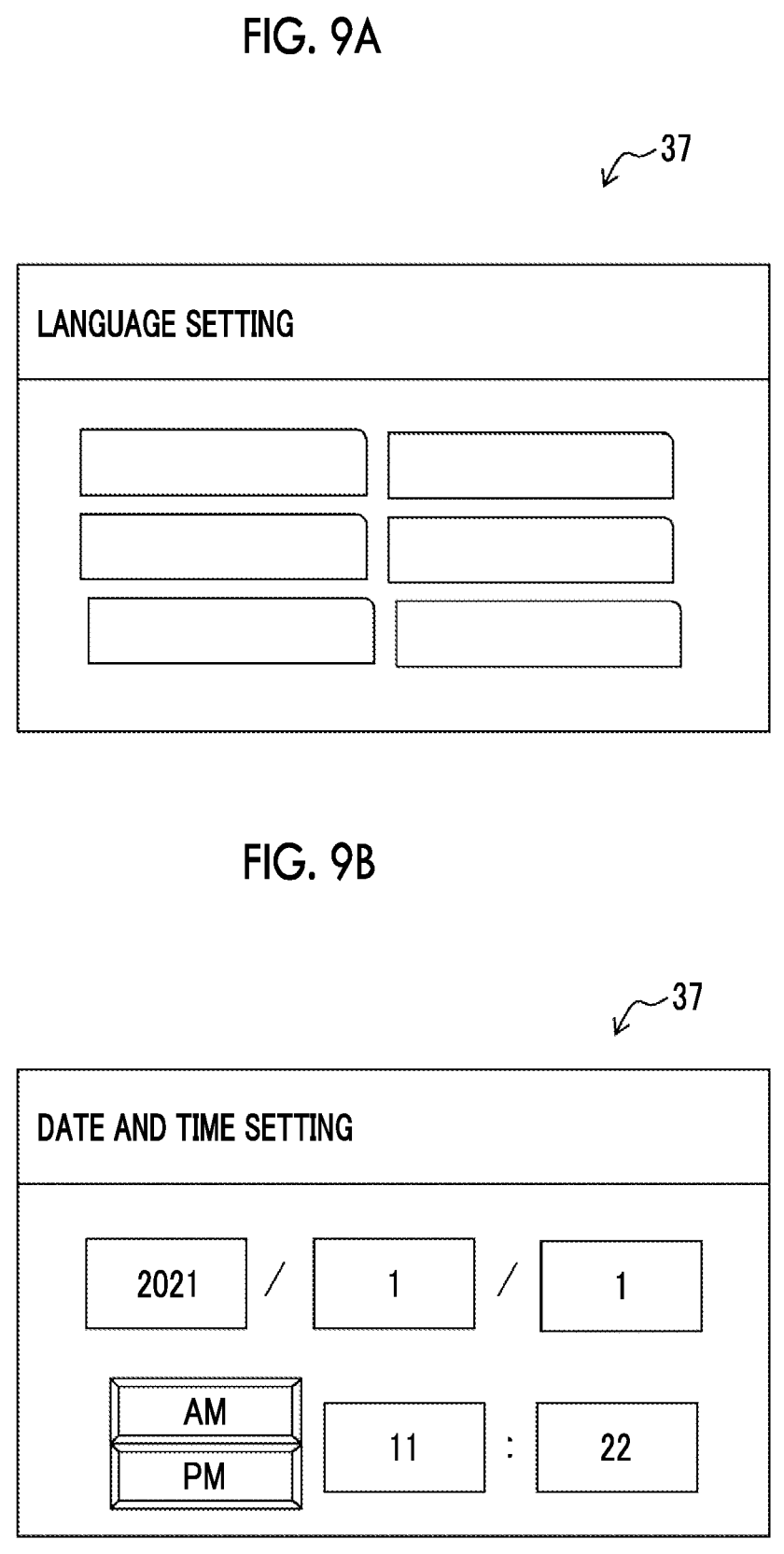

For example, as shown in FIGS. 9A and 9B, the CPU 31 may switch the display content of the display unit 37 from the state shown in FIG. 9A in which a language setting screen is displayed to the state shown in FIG. 9B in which a date and time setting screen is displayed by the hover operation. Further, as shown in FIGS. 10A to 10C, the CPU 31 has a hover operation, and the copy job execution screen may switch the display content of the display unit 37 from the state shown in FIG. 10A in which a fax broadcast transmission job execution screen is displayed to the state shown in FIG. 10B in which a copy job execution screen is displayed or the state shown in FIG. 10C in which a fax transmission job execution screen is displayed by the hover operation.

In the above exemplary embodiments, the area 55 surrounded by the broken line is displayed on the display unit 37 in order to show the user a portion where the hover operation is possible, but the method of presenting to the user is not limited thereto. For example, the background color of the portion where the hover operation is possible in the display unit 37 may be different from the background colors of other portions, or an icon or the like indicating the portion where the hover operation is possible may be displayed on the display unit 37.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a processor configured to:
switch one or more addresses to be displayed on a screen displaying the one or more addresses among a plurality of addresses used for a transmission function for transmitting information according to a change in coordinates of a moving object without touching the screen, wherein the processor is further configured to:
set an inertial state in which the plurality of addresses are inertially scrolled and the one or more addresses to be displayed on the screen are switched according to a moving speed at which the object moves the coordinates; and
after setting the inertial state, invalidate, during the inertial state, an instruction for scrolling the plurality of addresses in a direction opposite to a direction in which the plurality of addresses are being inertially scrolled.

2. The image forming apparatus according to claim 1, wherein the processor is configured to:
in a case where the object moves in a first direction, scroll the plurality of addresses in one direction and switch the one or more addresses to be displayed on the screen; and
in a case where the object moves in a second direction opposite to the first direction, scroll the plurality of addresses in the other direction opposite to the one direction and switch the one or more addresses to be displayed on the screen.

3. The image forming apparatus according to claim 2, wherein the processor is configured to:
in a case where the object moves in the first direction while an end address at an end of the plurality of addresses is displayed on the screen as the one or more addresses, switch the one or more addresses to be displayed on the screen to a head address at a head of the plurality of addresses; and
in a case where the object moves in the second direction while the head address is displayed on the screen as the one or more addresses, switch the one or more addresses to be displayed on the screen to the end address.

4. The image forming apparatus according to claim 3, wherein the processor is configured to:
in a case where the one or more addresses displayed on the screen are switched from the end address to the head address, or in a case where the one or more addresses displayed on the screen are switched from the head address to the end address, give a notification of information indicating that the one or more addresses have been switched.

5. A non-transitory computer readable medium storing an image forming program causing a computer to execute a process comprising:
switching one or more addresses to be displayed on a screen displaying the one or more addresses among a plurality of addresses used for a transmission function for transmitting information according to a change in coordinates of a moving object without touching the screen, wherein the process further comprises:
setting an inertial state in which the plurality of addresses are inertially scrolled and the one or more addresses to be displayed on the screen are switched according to a moving speed at which the object moves the coordinates; and
after setting the inertial state, invalidating, during the inertial state, an instruction for scrolling the plurality of addresses in a direction opposite to a direction in which the plurality of addresses are being inertially scrolled.

6. An image forming method comprising:
switching one or more addresses to be displayed on a screen displaying the one or more addresses among a plurality of addresses used for a transmission function for transmitting information according to a change in coordinates of a moving object without touching the screen, wherein the image forming method further comprises:
setting an inertial state in which the plurality of addresses are inertially scrolled and the one or more addresses to be displayed on the screen are switched according to a moving speed at which the object moves the coordinates; and
after setting the inertial state, invalidating, during the inertial state, an instruction for scrolling the plurality of addresses in a direction opposite to a direction in which the plurality of addresses are being inertially scrolled.

* * * * *